US012621266B2

(12) United States Patent
Gomez et al.

(10) Patent No.: US 12,621,266 B2
(45) Date of Patent: May 5, 2026

(54) SYSTEMS AND METHODS FOR PROBABILITY-BASED INLINE RULE INSPECTION

(71) Applicant: Zscaler, Inc., San Jose, CA (US)

(72) Inventors: Juan Gomez, San Jose, CA (US); Anna George, San Jose, CA (US); Jane Joseph, Leander, TX (US); Kanti Varanasi, Sunnyvale, CA (US); Nikhil Bhatia, San Jose, CA (US); Pankaj Kumar, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 19 days.

(21) Appl. No.: 18/752,226

(22) Filed: Jun. 24, 2024

(65) Prior Publication Data

US 2025/0392571 A1      Dec. 25, 2025

(51) Int. Cl.
| | |
|---|---|
| *H04L 9/40* | (2022.01) |
| *H04L 29/06* | (2006.01) |
| *H04L 47/20* | (2022.01) |

(52) U.S. Cl.
CPC .......... *H04L 63/0263* (2013.01); *H04L 47/20* (2013.01)

(58) Field of Classification Search
CPC ............................. H04L 63/0263; H04L 47/20
USPC ......................................................... 726/13
See application file for complete search history.

(56) References Cited

U.S. PATENT DOCUMENTS

| | | | | |
|---|---|---|---|---|
| 11,277,383 B2 * | 3/2022 | Devarajan | ............. | H04L 63/168 |
| 11,522,890 B2 * | 12/2022 | O'Neil | ................ | H04L 43/0817 |
| 11,811,855 B1 | 11/2023 | Mihajlovic et al. | | |
| 2016/0344754 A1 * | 11/2016 | Rayapeta | ............ | H04L 63/0227 |
| 2017/0201415 A1 * | 7/2017 | Radhakrishnan | ... | H04L 67/1097 |
| 2019/0319855 A1 * | 10/2019 | Barton | ................ | H04L 43/0876 |
| 2021/0336934 A1 | 10/2021 | Deshmukh et al. | | |
| 2021/0409441 A1 * | 12/2021 | Singh | .................. | H04L 63/1433 |
| 2022/0166665 A1 * | 5/2022 | O'Neil | ................ | H04L 41/0803 |
| 2023/0019448 A1 | 1/2023 | Deshmukh et al. | | |
| 2023/0171280 A1 * | 6/2023 | Bansal | ................ | H04L 63/0815 |
| | | | | 726/25 |
| 2023/0231884 A1 | 7/2023 | Deshmukh et al. | | |
| 2024/0121211 A1 | 4/2024 | Bhatia et al. | | |

FOREIGN PATENT DOCUMENTS

| | | | | | |
|---|---|---|---|---|---|
| CN | 109614367 A | * | 4/2019 | ........ | G06F 15/7807 |
| CN | 110138678 A | * | 8/2019 | ............ | H04L 47/32 |
| CN | 111626606 A | * | 9/2020 | .......... | G06Q 10/103 |
| CN | 115469833 A | * | 12/2022 | .............. | G06F 8/20 |
| CN | 115759733 A | * | 3/2023 | | |

* cited by examiner

*Primary Examiner* — Haresh N Patel
(74) *Attorney, Agent, or Firm* — Baratta Law PLLC; Lawrence A. Baratta, Jr.; Ryan Odessa

(57) ABSTRACT

Systems and methods for probability-based inline rule inspection include performing inline monitoring between one or more endpoints and the internet; receiving a payload based on the inline monitoring; and performing traffic inspection of the payload based on one or more rules, wherein each of the one or more rules are inspected based on a probability assigned thereto, and wherein the probability assigned to each of the one or more rules can be a function of an execution time of each of the one or more rules and a historic effectiveness of each of the one or more rules.

20 Claims, 10 Drawing Sheets

700

702

PERFORMING INLINE MONITORING BETWEEN ONE OR MORE ENDPOINTS AND THE INTERNET

704

RECEIVING A PAYLOAD BASED ON THE INLINE MONITORING

706

PERFORMING TRAFFIC INSPECTION OF THE PAYLOAD BASED ON ONE OR MORE RULES, WHEREIN EACH OF THE ONE OR MORE RULES ARE INSPECTED BASED ON A PROBABILITY ASSIGNED THERETO

GAP

TRAFFIC

PAYLOAD INSPECTION
RUN CONCURRENTLY ON
VARIOUS PIECES OF THE
PAYLOAD

750

752

PERFORMING INLINE MONITORING BETWEEN ONE
OR MORE ENDPOINTS AND THE INTERNET

754

RECEIVING A PAYLOAD BASED ON THE INLINE
MONITORING

756

PERFORMING TRAFFIC INSPECTION OF THE
PAYLOAD BASED ON ONE OR MORE INSPECTION
OFFSET VALUES, WHEREIN THE ONE OR MORE
INSPECTION OFFSET VALUES DEFINE ONE OR
MORE POINTS WITHIN THE PAYLOAD FOR
INSPECTION TO BEGIN

SYSTEMS AND METHODS FOR PROBABILITY-BASED INLINE RULE INSPECTION

FIELD OF THE DISCLOSURE

The present disclosure generally relates to network and cloud security. More particularly, the present disclosure relates to systems and methods for probability-based inline rule inspection.

BACKGROUND OF THE DISCLOSURE

Traffic inspection rules are fundamental to network security, providing a structured approach to analyzing and filtering network traffic to detect and prevent cyber threats. These rules emerged with the growth of networked systems and the increasing complexity of cyber threats. In the early days of network security, simple firewalls with basic rule sets were sufficient to manage traffic and protect against common threats. However, as cyber threats evolved in sophistication and diversity, the need for more advanced and comprehensive inspection techniques became apparent. As networks and threats continued to grow in complexity, the limitations of traditional rule-based systems became evident, particularly in terms of performance and scalability. The introduction of the advanced techniques described herein allow for more accurate and efficient detection of sophisticated threats.

BRIEF SUMMARY OF THE DISCLOSURE

The present disclosure relates to systems and methods for probability-based inline rule inspection. In various embodiments, the present disclosure includes a method having steps, a processing device configured to implement the steps, a cloud-based system configured to implement the steps, and as a non-transitory computer-readable medium storing instructions for programming one or more processors to execute the steps. The steps include performing inline monitoring between one or more endpoints and the internet; receiving a payload based on the inline monitoring; and performing traffic inspection of the payload based on one or more rules, wherein each of the one or more rules are inspected based on a probability assigned thereto.

The steps can further include wherein each of the one or more rules can be inspected concurrently for the payload. Each of the one or more rules can be inspected concurrently by different processors. The probability assigned to each of the one or more rules can be based on an execution time of each of the one or more rules. The probability assigned to each of the one or more rules can be based on a historic effectiveness of each of the one or more rules. The probability assigned to each of the one or more rules can be a function of an execution time of each of the one or more rules and a historic effectiveness of each of the one or more rules. The execution time of each of the one or more rules and the historic effectiveness of each of the one or more rules can be based on global log data. The execution time of each of the one or more rules and the historic effectiveness of each of the one or more rules can be based on tenant-based log data, wherein the inline monitoring is performed for a specific tenant. The steps can include selecting the one or more rules from a plurality of rules based on a probability assigned to each of the plurality of rules. The selecting can be performed at preconfigured time intervals, wherein the one or more selected rules are inspected for every payload encountered during the duration of a time interval subsequent to the selecting.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for probability-based inline rule inspection. The present disclosure provides various mechanisms for optimizing traffic inspection for inline utilization. In various embodiments, concurrent rule inspection is described. Further, probabilities can be assigned to rules, wherein the probabilities are utilized to select a set of rules to be utilized for inspection. In various embodiments, the rule probabilities can be based on various factors such as historic rule effectiveness, average rule processing time, etc. By employing the present mechanisms, inline traffic inspection can be performed with less computation expense and less latency, resulting in a much better user experience while maintaining security.

§ 1.0 Cybersecurity Monitoring and Protection Examples

Figure 1A:
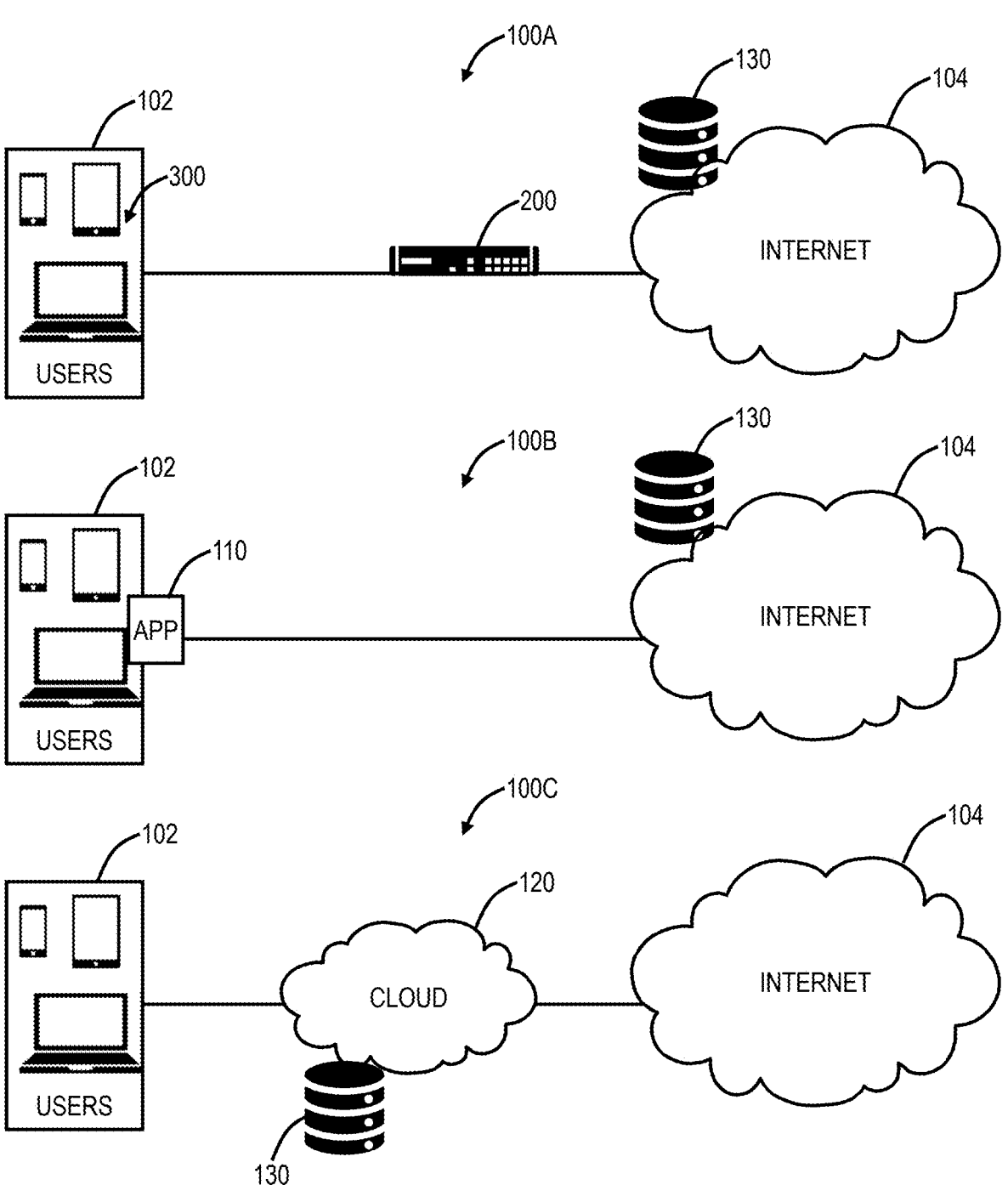
FIG. 1A is a network diagram of three example network configurations of cybersecurity monitoring and protection of a user.

FIG. 1A is a network diagram of three example network configurations 100A, 100B, 100C of cybersecurity monitoring and protection of an endpoint 102. Those skilled in the art will recognize these are some examples for illustration purposes, there may be other approaches to cybersecurity monitoring (as well as providing generalized services), and these various approaches can be used in combination with one another as well as individually. Also, while shown for a single endpoint 102, practical embodiments will handle a large volume of endpoints 102, including multi-tenancy. In this example, the endpoint 102 communicates on the Internet 104, including accessing cloud services, Software-as-a-

Figures 2, 3:
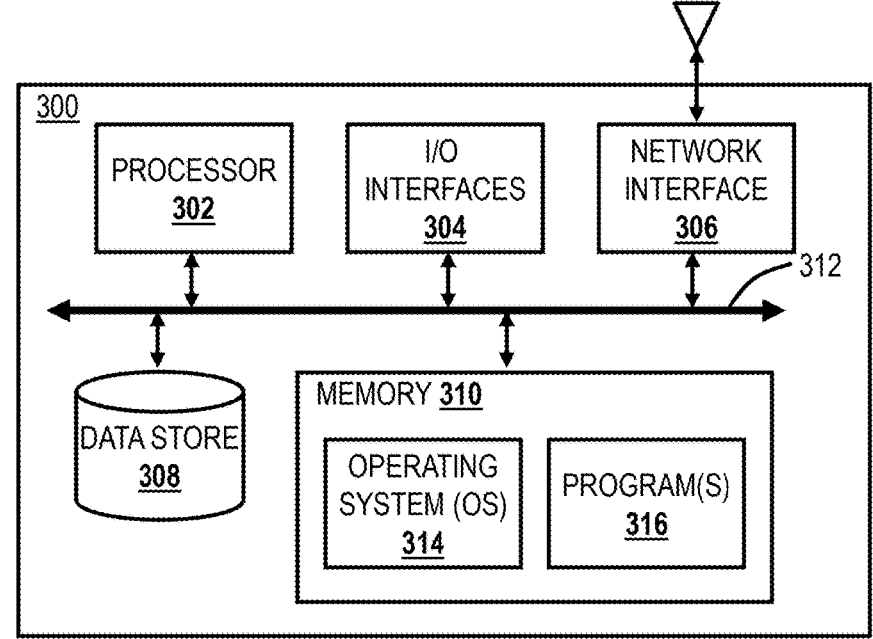
FIG. 2 is a block diagram of a server.
FIG. 3 is a block diagram of a computing device.

Service, etc. (each may be offered via computing resources, such as, e.g., using one or more servers 200 as illustrated in FIG. 2).

Note, the term endpoint 102 is used herein to refer to any computing device (see FIG. 3 for an example computing device 300) which can communicate on a network. The endpoint 102 can be associated with a user and include laptops, tablets, mobile phones, desktops, etc. Further, the endpoint can also mean machines, workloads, IoT devices, or simply anything associated with the company that connects to the Internet, a Local Area Network (LAN), etc.

As part of offering cybersecurity through these example network configurations 100A, 100B, 100C, there is a large amount of cybersecurity data obtained. Various embodiments of the present disclosure focus on using this cybersecurity data along with a customer's data to perform various security tasks including developing customer machine learning models and other security platforms of the like.

The network configuration 100A includes a server 200 located between the endpoint 102 and the Internet 104. For example, the server 200 can be a proxy, a gateway, a Secure Web Gateway (SWG), Secure Internet and Web Gateway, Secure Access Service Edge (SASE), Secure Service Edge (SSE), Cloud Application Security Broker (CASB), etc. The server 200 is illustrated located inline with the endpoint 102 and configured to monitor the endpoint 102. In other embodiments, the server 200 does not have to be inline. For example, the server 200 can monitor requests from the endpoint 102 and responses to the endpoint 102 for one or more security purposes, as well as allow, block, warn, and log such requests and responses. The server 200 can be on a local network associated with the endpoint 102 as well as external, such as on the Internet 104. Also, while described as a server 200, this can also be a router, switch, appliance, virtual machine, etc. The network configuration 100B includes an application 110 that is executed on the computing device 300. The application 110 can perform similar functionality as the server 200, as well as coordinated functionality with the server 200 (a combination of the network configurations 100A, 100B). Finally, the network configuration 100C includes a cloud service 120 configured to monitor the endpoint 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the endpoints 102, using signatures sourced and constantly updated. The DNS security can identify and route command-and-control connections to threat detection engines for full content inspection. The DLP can use standard and/or custom dictionaries to continuously monitor the endpoints 102, including compressed and/or Transport Layer Security (TLS) or Secure Sockets Layer (SSL)-encrypted traffic.

In typical embodiments, the network configurations 100A, 100B, 100C can be multi-tenant and can service a large volume of the endpoints 102. Newly discovered threats can be promulgated for all tenants practically instantaneously. The endpoints 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of endpoints 102 under management by an IT group, department, administrator, etc., i.e., some group of endpoints 102 that are managed together. One advantage of multi-tenancy is the visibility of cybersecurity threats across a large number of endpoints 102, across many different organizations, across the globe, etc. This provides a large volume of data to analyze, use machine learning techniques on, develop comparisons, etc. The present disclosure can use the term "service provider" to denote an entity providing the cybersecurity monitoring and a "customer" as a company (or any other grouping of endpoints 102).

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own endpoints 102 and configuration, policy, rules, etc.

§ 1.1 Cloud Monitoring

The cloud 120 can scale cybersecurity monitoring and protection with near-zero latency on the endpoints 102. Also, the cloud 120 in the network configuration 100C can be used with or without the application 110 in the network configuration 100B and the server 200 in the network configuration 100A. Logically, the cloud 120 can be viewed as an overlay network between endpoints 102 and the Internet 104 (and cloud services, SaaS, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the endpoints 102, as well as independent of platform, operating system, network access technique, network access provider, etc.

There are various techniques to forward traffic between the endpoints 102 and the cloud 120. A key aspect of the cloud 120 (as well as the other network configurations 100A, 100B) is that all traffic between the endpoints 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide the access control, threat prevention, and data protection. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated.

§ 1.2 Zero Trust

Figure 1B:
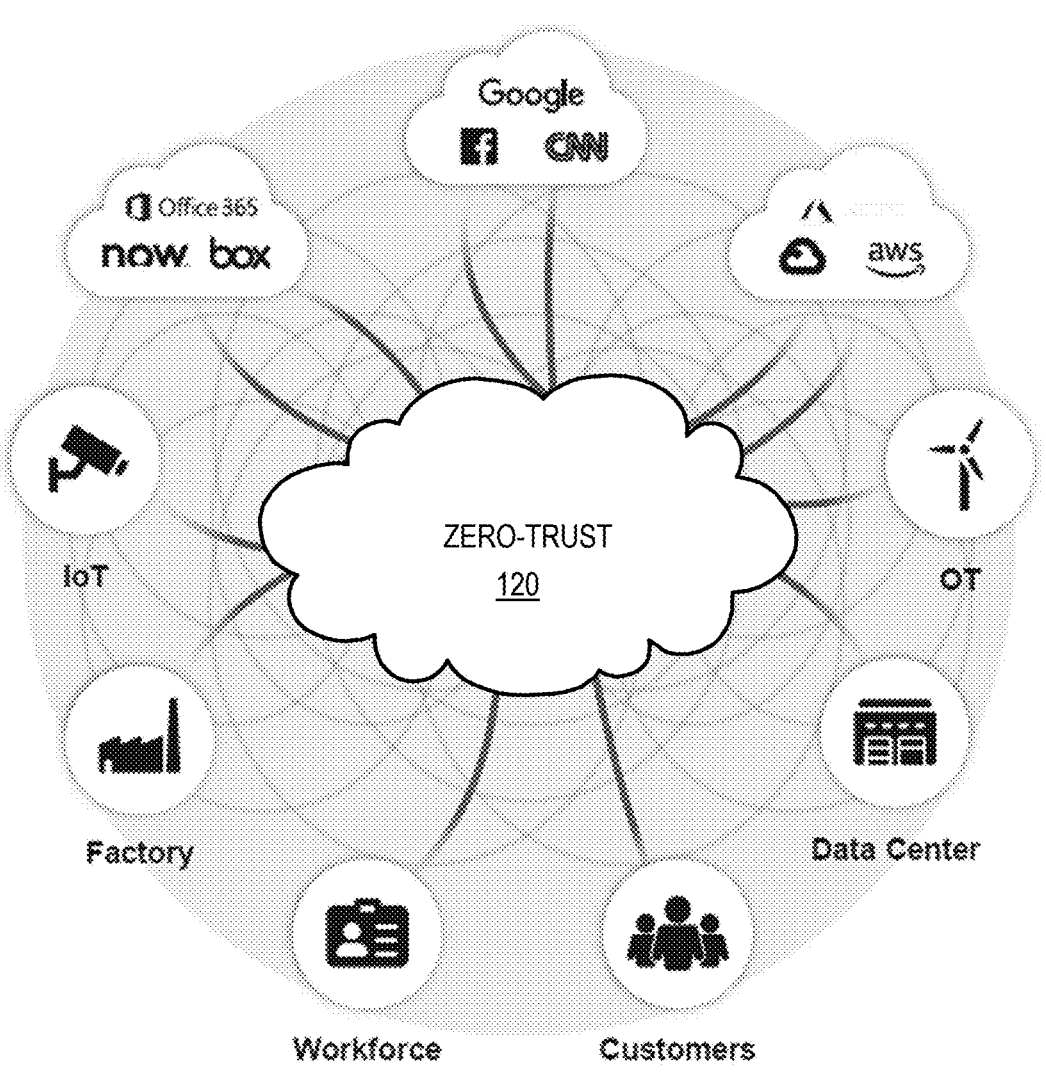
FIG. 1B is a logical diagram of the cloud operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120. Zero trust is a cybersecurity strategy where security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multifactor authentication (MFA) approaches beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

§ 1.3 Log Data

With the cloud 120 as well as any of the network configurations 100A, 100B, 100C, the log data 130 can include a rich set of statistics, logs, history, audit trails, and the like related to various endpoint 102 transactions. Generally, this rich set of data can represent activity by an endpoint 102. This information can be for multiple endpoints 102 of a company, organization, etc., and analyzing this data can provide a wealth of information as well as training data for machine learning models.

The log data 130 can include a large quantity of records used in a backend data store for queries. A record can be a collection of tens of thousands of counters. A counter can be a tuple of an identifier (ID) and value. As described herein, a counter represents some monitored data associated with cybersecurity monitoring. Of note, the log data can be referred to as sparsely populated, namely a large number of counters that are sparsely populated (e.g., tens of thousands of counters or more, and possible orders of magnitude or more of which are empty). For example, a record can be stored every time period (e.g., an hour or any other time interval). There can be millions of active endpoints 102 or more. Examples of the sparsely populated log data can be the Nanolog system from Zscaler, Inc., the applicant.

Also, such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

A key aspect here is that the cybersecurity monitoring is rich and provides a wealth of information to determine various assessments of cybersecurity. In some embodiments, the log data 130 can be referred to as weblogs or the like. Of note, with various cybersecurity monitoring techniques via the network configurations 100A, 100B, 100C, as well as with other network configurations, the log data 130 is a rich repository of endpoint 102 activity. Unlike websites, specific cloud services, application providers, etc., cybersecurity monitoring can log almost all of a user's 102 activity. That is, the log data 130 is not merely confined to specific activity (e.g., a user's 102 social networking activity on a specific site, a user's 102 search requests on a specific search engine, etc.).

§ 2.0 Example Server Architecture

FIG. 2 is a block diagram of a server 200, which may be used as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize the cloud 120 ultimately runs on one or more physical servers 200, virtual machines, etc.

§ 3.0 Example Computing Device Architecture

FIG. 3 is a block diagram of a computing device 300, which may be realize an endpoint 102. Specifically, the computing device 300 can form a device used by one of the endpoints 102, and this may include common devices such as laptops, smartphones, tablets, netbooks, personal digital assistants, cell phones, e-book readers, Internet-of-Things (IoT) devices, servers, desktops, printers, televisions, streaming media devices, storage devices, and the like, i.e., anything that can communicate on a network. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the computing device 300. For example, example programs 316 may include, but not limited to, a web browser, social networking applications, streaming media applications, games, mapping and location applications, electronic mail applications, financial applications, and the like. The application 110 can be one of the example programs.

§ 4.0 Application for Traffic Forwarding and Monitoring

Again, the network configuration 100B includes an application 110 that is executed on the computing device 300. The application 110 can perform similar functionality as the server 200, as well as coordinated functionality with the server 200 (a combination of the network configurations 100A, 100B). Of course, various embodiments are contemplated herein, including combinations of the network configurations 100A, 100B, 100C together. For example, the application 110 can perform similar functionality as the cloud 120, as well as coordinated functionality with the cloud 120.

Figure 4:
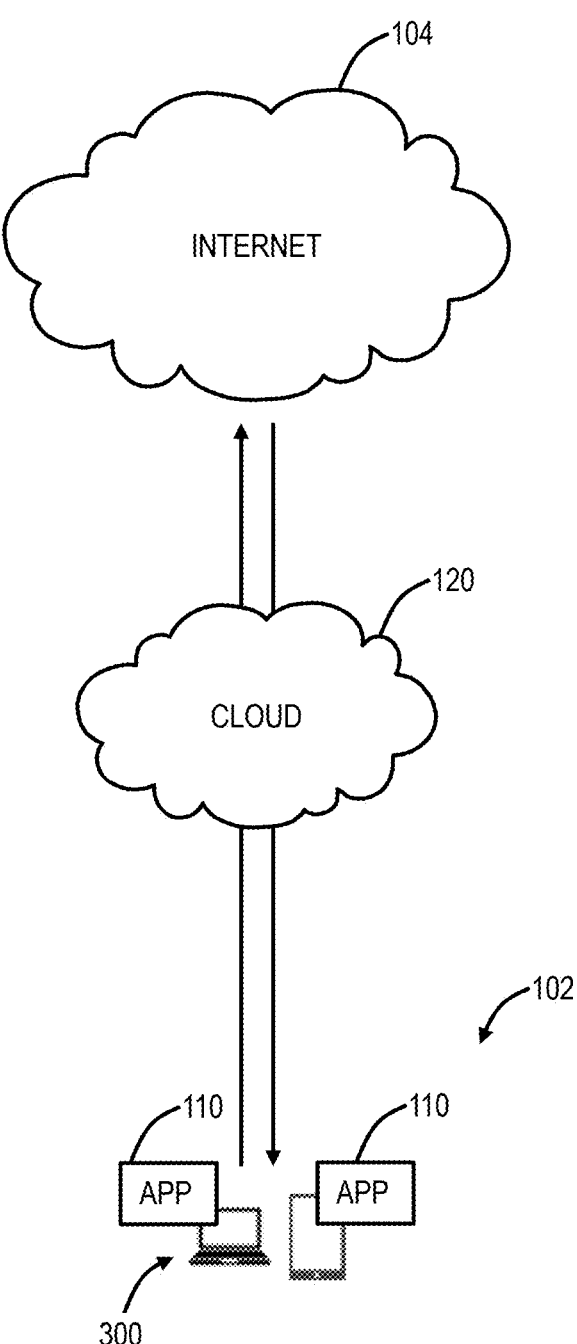
FIG. 4 is a diagram of an exemplary network configuration illustrating an application on computing devices configured to operate through the cloud.

FIG. 4 is a network diagram of an exemplary network configuration illustrating an application 110 on computing devices 300 configured to operate through the cloud 120. Different types of computing devices 300 are proliferating, including Bring Your Own Device (BYOD) as well as IT-managed devices. The conventional approach for a computing device 300 to operate with the cloud 120 as well as for accessing enterprise resources includes complex policies, VPNs, poor user experience, etc. The application 110 can automatically forward user traffic with the cloud 120 as well as ensuring that security and access policies are enforced, regardless of device, location, operating system, or application. The application 110 automatically determines if a user 102 is looking to access the open Internet 104, a SaaS app, or an internal app running in public, private, or the datacenter and routes mobile traffic through the cloud 120. The application 110 can support various cloud services, including ZIA, ZPA, ZDX, etc., allowing the best in class security with zero trust access to internal applications. As described herein, the application 110 can also be referred to as a connector application.

The application 110 is configured to auto-route traffic for seamless user experience. This can be protocol as well as application-specific, and the application 110 can route traffic with a nearest or best fit node of the cloud 120. Further, the application 110 can detect trusted networks, allowed applications, etc. and support secure network access. The application 110 can also support the enrollment of the computing device 300 prior to accessing applications, the internet, or any services provided by the cloud 120. The application 110 can uniquely detect the users 102 based on fingerprinting the user device 300, using criteria like device model, platform, operating system, device posture, etc. The application 110 can support Mobile Device Management (MDM) functions, allowing IT personnel to deploy and manage the computing devices 300 seamlessly. This can also include the automatic installation of client and SSL certificates during enrollment. Finally, the application 110 provides visibility into device and app usage of the user 102 of the computing device 300.

The application 110 supports a secure, lightweight tunnel between the computing device 300 and the cloud 120. For example, the lightweight tunnel can be HTTP-based. With the application 110, there is no requirement for PAC files, an IPSec VPN, authentication cookies, or user 102 setup.

§ 5.0 Traffic Inspection Rules

Traffic inspection rules are predefined criteria used by network security systems to analyze and filter network traffic, aiming to detect and prevent various security threats such as malware, unauthorized access, data exfiltration, and other malicious activities. These rules operate at different levels of the network stack, from the application layer down to the transport and network layers, ensuring comprehensive security coverage. Key components of traffic inspection rules include signature-based rules, which detect known threats by matching traffic against a database of known threat patterns; behavioral rules, which identify anomalies or deviations from normal traffic patterns; protocol analysis rules, which ensure traffic adheres to standard protocols; contextual rules, which use additional information such as user identity and geographical location to make informed security decisions; and content filtering rules, which analyze the actual content of the traffic to block malicious or inappropriate content.

The process begins with rule matching, where traffic inspection systems like Intrusion Detection Systems (IDS) and Intrusion Prevention Systems (IPS) continuously monitor network traffic and check each packet or data flow against the set of predefined rules. When traffic matches a rule, actions such as generating alerts, blocking traffic, quarantining suspicious data, or logging events are triggered. Effective rule management involves regularly updating rules to keep pace with evolving threats, prioritizing rules based on threat criticality and likelihood, and balancing accuracy to minimize false positives and negatives.

Challenges in traffic inspection rules include the potential performance impact of inspecting traffic against numerous rules, scalability issues as network traffic grows, and the need to balance accuracy and performance. Advanced techniques to address these challenges described herein include the integration of machine learning and artificial intelligence to identify patterns and anomalies that traditional methods might miss, parallel processing to reduce inspection time, and adaptive inspection mechanisms that dynamically adjust inspection depth and rule use based on current threat levels and network conditions. These improvements are essential for maintaining network security in an ever-evolving threat landscape.

§ 6.0 Inline Traffic Inspection Rule Probabilities

Traffic inspection to detect security threats can be highly resource-intensive, often requiring the application of numerous rules—sometimes in the tens or hundreds—against which traffic must be examined. This extensive inspection process introduces additional delays to the sessions containing this traffic, negatively impacting overall network performance and user experience. Moreover, the computing resources required for thorough packet inspection are finite. When faced with a high number of concurrent connections, these resources can become maxed out, leading to potential bottlenecks and reduced inspection efficacy.

In this disclosure, several methods are proposed to optimize traffic inspection, aiming to enhance both efficiency and effectiveness while minimizing delays and resource consumption. Various approaches involve the prioritization and streamlining of security rules. By categorizing rules based on their importance and likelihood of detecting threats, the systems can ensure that the most critical rules are applied first. Additionally, using rule aggregation techniques, redundant or overlapping rules can be combined, reducing the overall number of rules that need to be processed. Implementing advanced load-balancing algorithms can significantly improve the distribution of inspection tasks across available resources. This ensures that no single resource is overwhelmed, thereby preventing bottlenecks and maintaining high inspection performance even during peak traffic periods.

Adaptive inspection mechanisms can dynamically adjust the depth and intensity of traffic analysis based on various conditions. Leveraging machine learning and artificial intelligence can enhance threat detection capabilities by identifying patterns and anomalies more quickly and accurately than traditional rule-based systems. These intelligent systems can learn from past traffic and threat data, continuously improving their detection algorithms and reducing the need for extensive rule-based inspections.

Integrating scalable cloud-based inspection services can offer a flexible solution to resource limitations. These services can expand or contract based on demand, ensuring that sufficient resources are always available to handle traffic inspection without compromising performance. This scalability is particularly beneficial during traffic surges, maintaining the integrity of the inspection process without overburdening on-premises resources. Further, implementing optimized session management techniques can help in managing and reducing the delays caused by traffic inspection. By segmenting sessions and applying inspections more selectively, based on session characteristics and historical data, unnecessary delays can be minimized.

In addition to the various methods described, a plurality of enhanced optimization methods are further introduced to resolve the issues currently witnessed by traffic inspection systems. In various embodiments, concurrent rule evaluation is enabled for greatly reducing the processing time for rule inspection. More specifically, in traditional packet inspection, a given payload is processed serially through a predefined set of rules to detect any potential threats. This means that each rule is applied one after the other in a sequential manner. Once a rule matches a threat, the processing of the payload stops immediately, and an appropriate action, such as blocking the traffic or logging the event, is taken. If no rules match the payload, the traffic is allowed to proceed without any intervention. However, this serial processing can introduce significant delays, as the payload must be inspected against each rule individually, extending the total inspection time to the sum of all rule evaluations.

To address this issue, the present disclosure proposes a system where multiple rules are evaluated concurrently, significantly reducing the delay introduced by traffic inspection. In this parallel processing approach, the payload is simultaneously examined against multiple rules using multithreading or parallel computing techniques. By leveraging modern multi-core processors and distributed computing frameworks, this method allows for a more efficient inspection process, as multiple rules can be processed at the same time rather than in a linear sequence.

Figure 5:
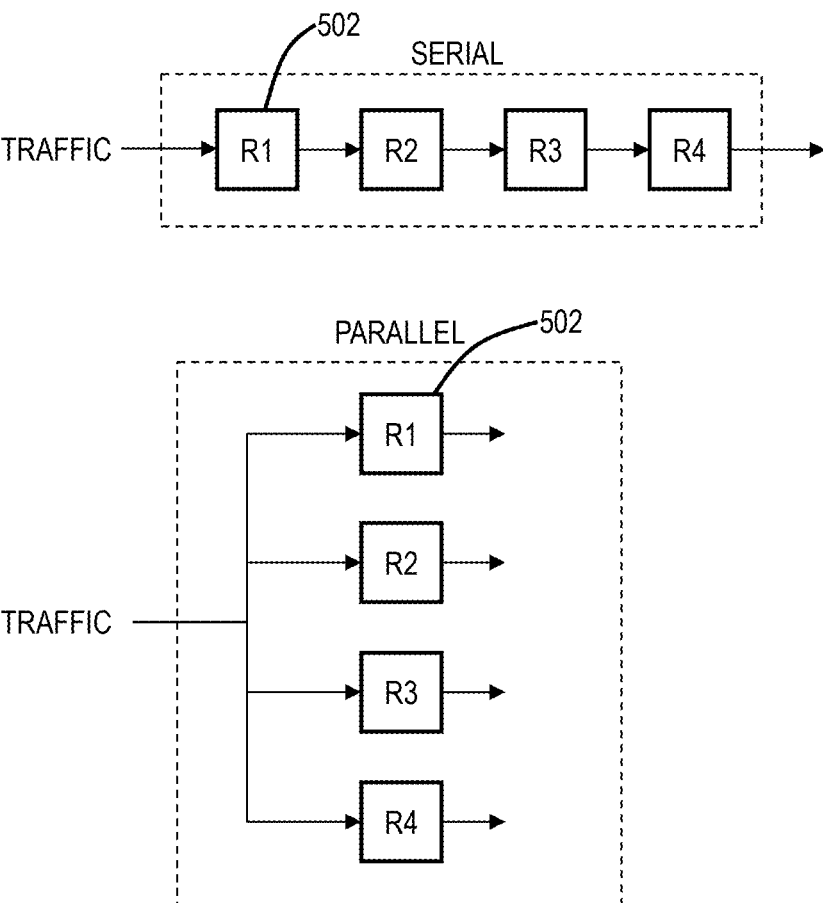
FIG. 5 is a flow diagram comparing serial rule evaluation vs. parallel rule evaluation.

FIG. 5 is a flow diagram comparing serial rule evaluation vs. parallel rule evaluation. It can be seen that the traditional method of evaluating rules 502 (R1, R2, R3, R4) requires each rule to be evaluated in a predefined order until either there is a hit (a detection), or until all rules are evaluated. Alternatively, by utilizing the parallel evaluation methods described herein, each rule 502 can be evaluated concurrently. This can be done by receiving a packet/payload and subjecting the payload to concurrent examination by a plurality of rules via a plurality of processors, machines, etc. Thus, if a rule receives a hit, then the systems can perform an action based thereon, and if there is no rule hit, the maximum processing time is based on the processing times of individual rules and not the sum of the processing times of all rules.

The concurrent evaluation of rules not only speeds up the inspection process but also enhances the overall throughput of the system, allowing it to handle higher volumes of traffic without compromising security. This approach can be particularly beneficial in high-traffic environments, where the number of packets to be inspected can quickly overwhelm a system relying on traditional serial processing methods. By reducing the inspection delay, the proposed system ensures that legitimate traffic experiences minimal latency, improving the user experience and maintaining the performance of the network.

Additionally, this method can be integrated with adaptive load balancing techniques to dynamically allocate computational resources based on current traffic loads and threat levels. This ensures that the system remains efficient and responsive, even during peak traffic periods or when facing sophisticated threats that require more intensive inspection.

In a use case, suppose there are four rules to inspect for a given payload. These rules can be contemplated as rules R1, R2, R3, and R4 where the maximum processing time for each rule is Tr1, Tr2, Tr3, and Tr4 respectively. These maximum processing times can be determined based on historic rule evaluation. Based thereon, with traditional methods, the upper bound of processing time for inspecting a payload with these rules serially is Tr+Tr2+Tr3+Tr4. By utilizing the present approach, the rules can be run concurrently in different processors resulting in a reduced maximum delay of (Tr1, Tr2, Tr3, Tr4). That is, the maximum delay is the length of processing time for the single rule that has the largest processing time, not the sum of processing time of all rules. For example, if R1 has the highest maximum processing time of all the rules, the maximum delay for evaluating all rules will only be Tr1.

It will be appreciated that the present traffic inspection methods can be performed via any of the network configurations 100A, 100B, 100C for cybersecurity monitoring and protection. That is, the traffic inspection is performed inline via the cloud 120, one or more servers 200, the application 110, etc. The processes can be performed on any of a physical server 200, one or more nodes of the cloud 120, virtual machines, and the application 110, each of which can be associated with one or more processors and memory having instructions thereon for implementing the present steps for traffic inspection optimization.

In various embodiments, further optimization mechanisms are implemented including controlling the number of times or frequency with which a rule is inspected. That is, rules can be assigned probabilities which determine the frequency which the rules are evaluated for received payloads. These rule probabilities can be based on rule characteristics including average processing time, effectiveness, etc. In an embodiment, rules that take a relatively short time to execute, i.e., have a short average processing time, can be used to inspect all payloads, while rules that incur longer processing times can be performed less frequently. For example, if it is observed that a specific rule has a relatively large execution time, the systems can decide to perform inspection with that rule based on a lower probability. Further, the systems can also take into consideration the effectiveness of a specific rule. For example, if a rule is rarely triggered, the systems can decide to perform the inspection related to that rule with less probability, i.e., lower the probability of the rule. The probability described herein is the probability that a specific rule will be utilized while inspecting a payload. Thus, a lower probability will result in that rule being utilized less.

These probabilities can be referenced when determining which rules to examine for a given payload. That is, upon receiving a payload, the systems can perform a computation to select a set of rules based on their assigned probabilities. This computation can include a rule selection process where a rules probability determined its probability of being selected. In various embodiments, sets of rules can be determined based on preconfigured time intervals. That is, at specific time periods, the rule selection process can be performed for determining a set of rules to be used for a specific time period. This rule selection can be repeated for each interval, where payloads received within a time period will be evaluated based on the set of rules determined for that interval. This is useful because rule probabilities can be continuously updated based on updated effectiveness to stay relevant with current attack trends.

Therefore, the present inspection systems can employ a mechanism where rules are applied to traffic based on a probability that is a function of the processing time of the rule. In traditional inspection systems, rules are applied to traffic inspection with a probability of 1, thus all rules are always used. In the present system, upon receiving each new packet the system will apply a given rule to traffic with probability which is a function of the average processing time for the rule. For example, for rule R1 the systems will apply it with probability p(Tr1-avg), where Tr1-avg is the average processing time for rule R1. Again, as described, the probability associated with a rule can be further based on its effectiveness in addition to other factors.

In order to facilitate such mechanisms, various rule data must be logged for determining a probability therefor. Thus, the present systems are adapted to compute and store various rule characteristics/data which is then used to determine a probability for each rule. In cases where processing time is utilized to determine rule probability, an average processing time can be computed from local or aggregated samples. Alternatively, the average processing time can be computed over a time period. As stated, this average processing time can be utilized to determine a rule probability, where a higher average processing time for a rule will result in a lower rule probability for that rule, meaning the rule will be utilized less.

As described, in various embodiments, the present systems can also employ a mechanism where rules are applied to traffic with a probability that is a function of the effectiveness of the rule. In traditional inspection systems, rules are applied to traffic inspection with probability 1. In the proposed system, upon receiving each new packet the system will apply a given rule to traffic based on a probability which is a function of past history of effectiveness of the rule. Effectiveness can be a measure of how many times the rule has been hit in some interval of past history. For example, for rule R1 the system will apply it with a probability of p(R1-hit-ratio), where R1-hit-ratio is a measure of how many times the rule has been hit over a number of applications or a time window (hit ratio).

In various embodiments, the hit ratio can be computed based on local data, i.e., rule hit data of a single tenant of the cloud 120, or based on global data, i.e., rule hit data based on all historic inspection data of the cloud 120. Further, for each rule, the hit ratio can be maintained over a preconfigured time window, where updated hit ratios can be computed for rules intermittently. This process ensures that the most prevalent rules are utilized within evolving landscapes.

Again, the rule probability of a rule can be a function of either the average processing time and the hit rate, or a combination of both. That is, the rule probability p can be p(Tri-avg, Ri-hit-ratio) where (i) represents a specific rule Ri.

Figure 6:
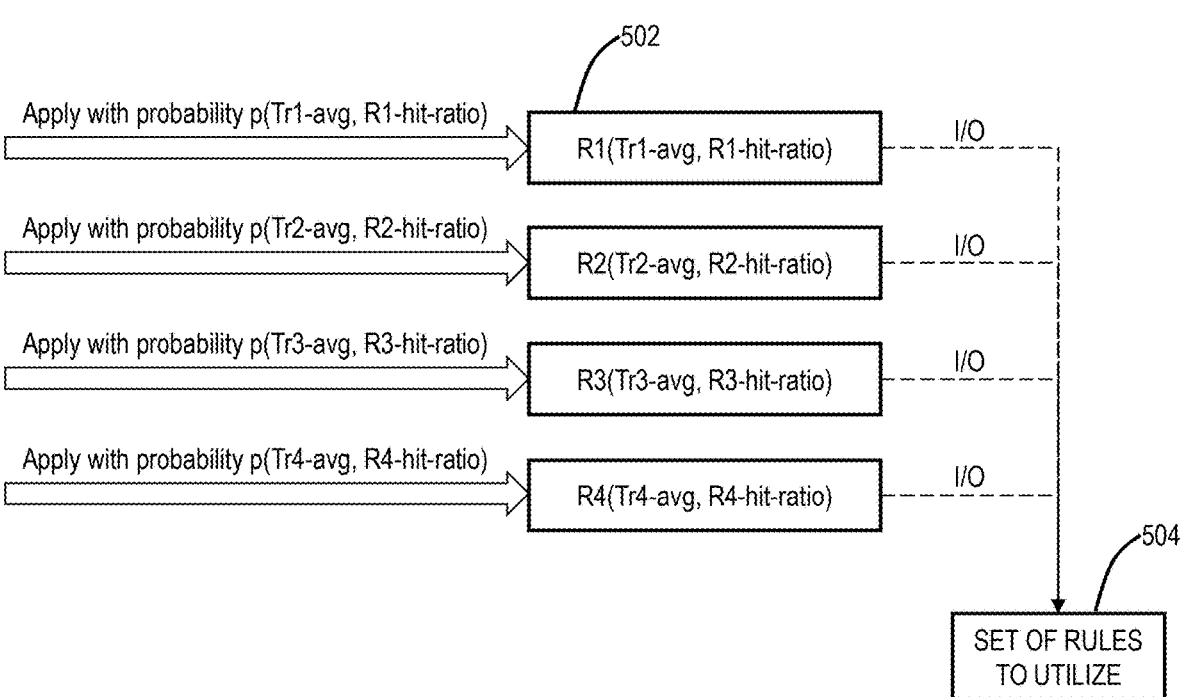
FIG. 6 is a flow diagram of a rule selection process.

FIG. 6 is a flow diagram of a rule selection process. Again, this rule selection process is based on a probability p assigned to each of the available rules 502. More specifically, a set of rules 504 is determined based on the probabilities of each of the rules 502. Again, this determination can be random, where the rules are randomly selected based on the probability. As described, the probability of a rule can be based on the average processing time of the rule, the hit ratio of the rule, and a combination thereof. Further, sets of rules can be determined based on preconfigured time intervals, where for each time interval, a new set of rules is determined and used for that interval. Again, the probability of each rule can be continuously updated/dynamic based on updated hit ratios, thereby, the sets of rules can be dynamic and better suited for current threat characteristics. For example, if a specific rule has a low hit ratio and subsequently a low probability, but the rule experiences an increase in its hit ratio, the rules probability will subsequently increase, therefore the rule has a higher chance of being utilized in the future. By doing this, the rules can be dynamically utilized based on current characteristics of threats encountered.

The log data for determining rule probabilities can be stored in a central system such as in the log data 130. Again, the log data can include rule processing times, rule hit ratios, etc. The log data can be continuously updated in order to better characterize current rule characteristics as described herein.

Again, the data used for determining rule probabilities can be tenant-based or global. For example, rule hit ratios can be computed based on a specific tenant's environment or based on the global effectiveness of the rule. By doing so, the sets of utilized rules can be tailored based on global threat trends.

Further, in various embodiments, relevance of rules are maintained in a centralized system and then applied with probability that is proportional to their global relevance. For example, attacks that trigger certain rules are usually synchronized in time and hence the relevance of a rule changes with the types of current attacks being observed globally. Based on this rationale, the systems can factor this relevance in the probability used to apply or not apply a rule. As an example, if a rule's global hit ratio has increased significantly in recent history, the rule will be applied with a higher probability.

By performing the rule probability computation and assignment described herein for each available rule, the inline traffic inspection mechanisms described herein can reduce the amount of latency associated with inline traffic inspection while utilizing effective rules. This reduced latency can be attributed to rules being utilized based on their rule probability, therefore, rules which have appropriate processing times, and which have been proven to be effective, will be utilized more frequently, whereas rules that have longer processing times and have lower hit ratios will be utilized less. Again, in various embodiments, these mechanisms can further be utilized with the concurrent rule processing methods also described herein for further streamlining.

By adopting these methods, the present systems aim to optimize traffic inspection processes, providing a balanced approach that ensures robust security while maintaining high performance and resource efficiency. This strategy addresses both the technical challenges and operational constraints associated with traffic inspection, ultimately enhancing network security and user experience.

§ 6.1 Rule Probability Based Traffic Inspection Process

Figure 7:
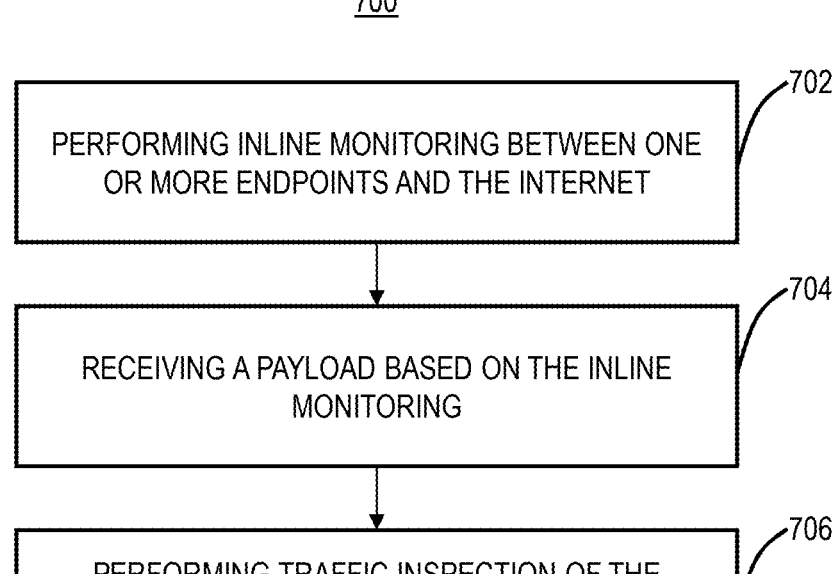
FIG. 7 is a flowchart of a process for optimizing rule inspection for payloads.

FIG. 7 is a flowchart of a process 700 for optimizing rule inspection for payloads. In various embodiments, the present disclosure includes a method having steps, a processing device configured to implement the steps, a cloud-based system configured to implement the steps, and as a non-transitory computer-readable medium storing instructions for programming one or more processors to execute the steps. Again, the steps can be performed by any of the server 200, cloud 120, application 110, and any combination thereof. The steps include performing inline monitoring between one or more endpoints and the internet (step 702); receiving a payload based on the inline monitoring (step 704); and performing traffic inspection of the payload based on one or more rules, wherein each of the one or more rules are inspected based on a probability assigned thereto (step 706).

The process 700 can further include wherein each of the one or more rules can be inspected concurrently for the payload. Each of the one or more rules can be inspected concurrently by different processors. The probability assigned to each of the one or more rules can be based on an execution time of each of the one or more rules. The probability assigned to each of the one or more rules can be based on a historic effectiveness of each of the one or more rules. The probability assigned to each of the one or more rules can be a function of an execution time of each of the one or more rules and a historic effectiveness of each of the one or more rules. The execution time of each of the one or more rules and the historic effectiveness of each of the one or more rules can be based on global log data. The execution time of each of the one or more rules and the historic effectiveness of each of the one or more rules can be based on tenant-based log data, wherein the inline monitoring is performed for a specific tenant. The steps can include selecting the one or more rules from a plurality of rules based on a probability assigned to each of the plurality of rules. The selecting can be performed at preconfigured time intervals, wherein the one or more selected rules are inspected for every payload encountered during the duration of a time interval subsequent to the selecting.

§ 7.0 Offset Traffic Inspection

Again, traffic inspection to detect security threats can be highly resource-intensive, often requiring the application of tens or hundreds of rules against which traffic must be scrutinized. This thorough inspection process introduces additional delays to the sessions containing this traffic, negatively impacting overall performance and user experience. Moreover, the computing resources required for packet inspection are finite. When faced with a high number of concurrent connections, these resources can become overwhelmed, leading to potential bottlenecks and reduced inspection efficacy.

In this disclosure, several methods to mitigate these issues and optimize traffic inspection are proposed. With the ever-increasing number of cyber threats, the rules or checks required to inspect packets will only grow in complexity and number. Traditionally, the part of the payload inspected is limited in size to conserve resources, but this approach can leave gaps in security, as malicious threats may be hidden towards the end of the payload that is not inspected. To mitigate the risks associated with not inspecting parts of the payload, the present systems further include mechanisms that ensure comprehensive payload analysis. By utilizing the present mechanisms, the likelihood of detecting hidden threats increases, providing a more thorough security check without excessively draining resources.

In various embodiments, the systems are adapted to change the offset at which inspection of a payload starts. That is, the systems are adapted to determine an offset at which inspection of a payload should start. More particularly, an inspection offset value define a point within the payload for inspection to begin. In various embodiments, this offset can be determined at random in order to detect the most threats regardless of whether they are placed at the start or end of packets. Further, in various embodiments, various sections of the payload can be examined concurrently to accelerate the time of inspection, where each of the various sections is associated with an offset.

Figure 8:
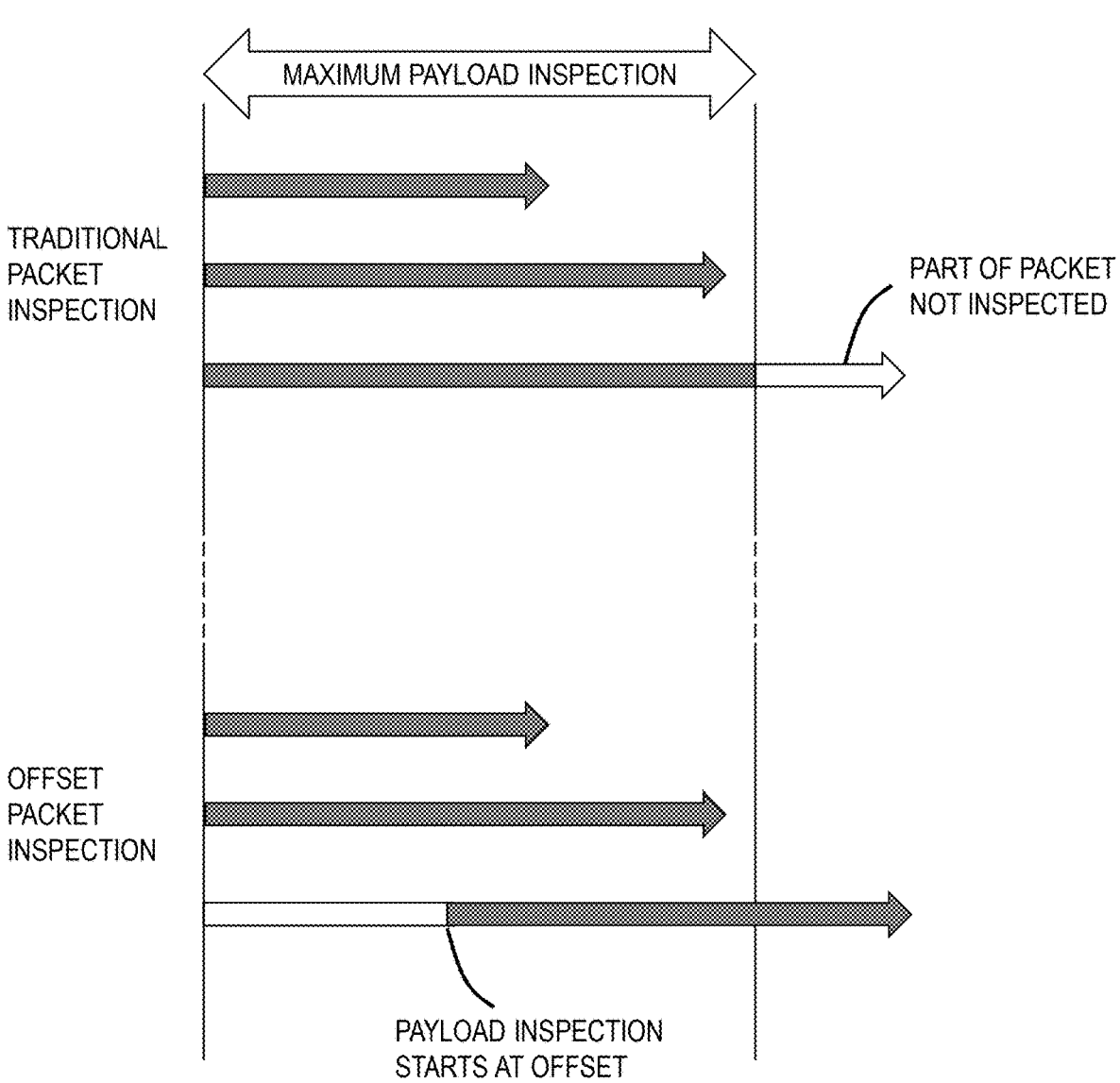
FIG. 8 is a diagram comparing traditional traffic inspection to offset traffic inspection.

FIG. 8 is a diagram comparing traditional traffic inspection to offset traffic inspection. As described, most systems have limits in the payloads they inspect and their inspection usually starts at offset 0 of the payload. The present mechanism to randomize the offset at which inspection starts allows the inline inspection system to more accurately protect against threats in large payloads that would not be examined in traditional systems.

Figure 9:
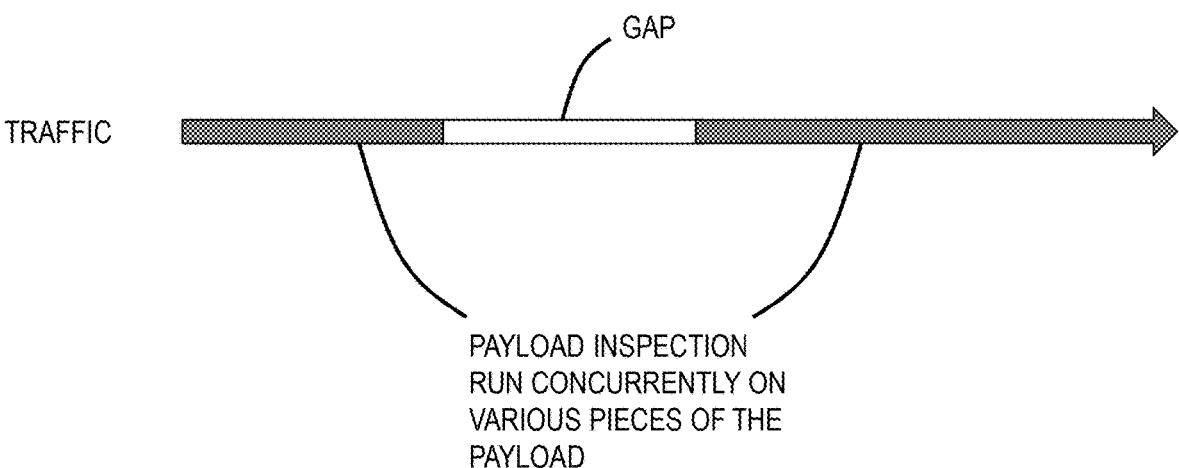
FIG. 9 is a diagram showing concurrent inspection of various pieces of a payload.

Further, as described, the present systems can employ concurrent inspection at various offsets of payloads to accelerate the detection of malicious threats. FIG. 9 is a diagram showing concurrent inspection of various pieces of a payload. Again, this concurrent inspection can be done on a plurality of processors for accelerating the inspection of payloads inline.

Again, in various embodiments, offsets can be determined based on a random computation. For example, if the offset can be any number between 0 and 1, 0 representing the start and 1 representing the end of a payload, the systems can generate a random offset value to utilize for payload inspection. In various other embodiments, the offset can be determined based on locations within payloads where recent violations have been detected. That is, various offsets can be defined and assigned probabilities, where these probabilities are based on historic violation detection, i.e., based on the effectiveness of each of the offset values. For example, assume a plurality of violations were detected based on an offset of 0.4, where 0 represents the beginning/head of a payload and 1 represents the end/tail of a payload. Thus, an offset of 0.4 would cause the inspection to begin at 0.4. Because this offset has been historically proven to be effective, either globally or locally to the tenant's environment, this offset of 0.4 will be assigned a higher probability. Thus, this offset will have a higher chance of being utilized. Based thereon, the offset determination for inspection can be based on historic effectiveness of various offsets and not purely random. The offset determination can be done for each incoming payload or based on time intervals as described above.

In order to facilitate the steps described above, the present systems are adapted to track and log offsets with most recent violations and examine those with higher probabilities. In various embodiments, a plurality of inspection offset values such as 0.1, 0.2, 0.3, etc. can be defined and assigned probabilities. Further, violation detection data can be stored for each of these offset values for updating their respective probabilities, for example in the log data 130.

As described, various inspection offsets can be applied to a single payload, where inspection is performed concurrently based on the various offsets. This is ideal for very large payloads that would otherwise require a long processing time or leave a large portion of the payload uninspected. The inspection size for each piece can be any length beginning from the prescribed offset. For example, the system can be adapted to perform inspection for a specific amount of data within a payload. As shown in FIG. 8, this inspection can begin at a prescribed offset. Thus, when utilizing a plurality of offsets with concurrent inspection, the inspected portions can overlap to detect threats that would otherwise span gaps between various pieces of a given payload. Such a gap is depicted in FIG. 9. The plurality of offsets, also referred to as inspection offsets, define a plurality of pieces of the payload to be inspected, the size of the pieces being based on the maximum inspection size (maximum payload inspection in FIG. 8). For example, if a particular payload is 100 MB in size, and the determined offsets include 0.2 and 0.6, and the inspection size is 40 MB, then the pieces of the payload that will be inspected include the chunks of 20-60 MB and 60-100 MB. Again, these pieces can be inspected concurrently by different processors as described above.

Further, in various embodiments, the maximum inspection size, i.e., the amount of the payload to be inspected, can be based on availability of compute resources. That is, when an excess of compute resources are available, for example during low traffic, the amount of data from a payload to be inspected can be increased. Alternatively, if a limited amount of compute resources are available, i.e., during high traffic situations, the amount of a payload to be inspected can be decreased. Again, the inspection can begin at various offsets and include specific amounts of data based on available resources/traffic congestion. By doing so, the present traffic inspection can be dynamic in nature with respect to the amount of a payload that is to be inspected, further increasing the effectiveness of the inspection when possible.

In various embodiments, each of the traffic inspection mechanisms described herein can be utilized in combination. That is, the concurrent inspection, rule probability and selection, payload inspection offsets, etc. can be utilized together to optimize inline traffic inspection. Further, the data utilized for computing the various probabilities, i.e., the rule hit ratios, processing times, offset value effectiveness, etc. can include tenant specific data or global data, thereby tailoring a tenant's traffic inspection system for their environment or including global data for better threat characterization and rule/offset selection.

§ 7.1 Offset Traffic Inspection Process

Figure 10:
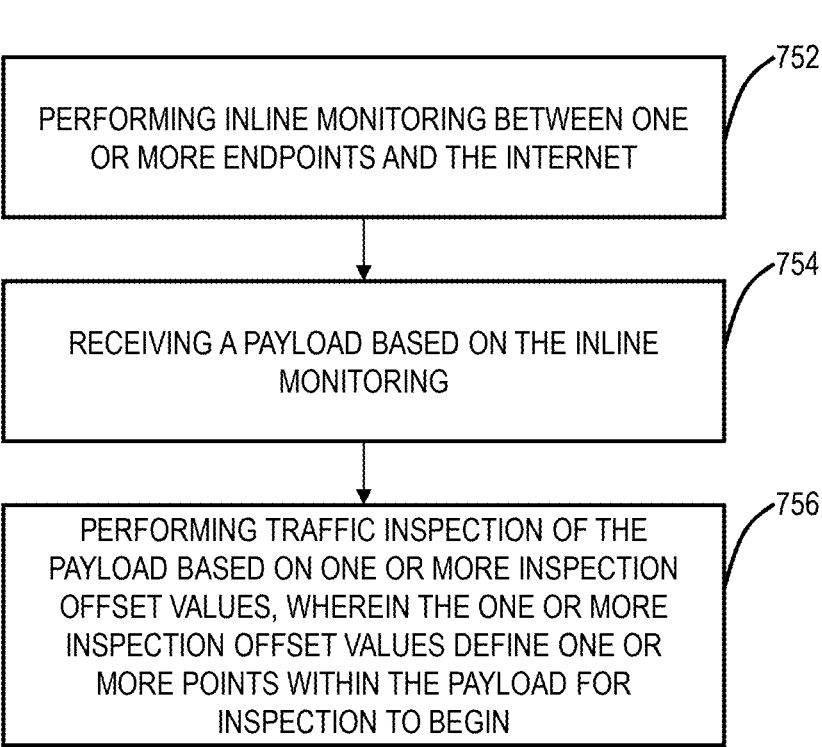
FIG. 10 is a flowchart of a process for offset traffic inspection.

FIG. 10 is a flowchart of a process 750 for offset traffic inspection. In various embodiments, the present disclosure includes a method having steps, a processing device configured to implement the steps, a cloud-based system configured to implement the steps, and as a non-transitory computer-readable medium storing instructions for programming one or more processors to execute the steps. Again, the steps can be performed by any of the server 200, cloud 120, application 110, and any combination thereof. The steps include performing inline monitoring between one or more endpoints and the internet (step 752); receiving a payload based on the inline monitoring (step 754); and performing traffic inspection of the payload based on one or more inspection offset values, wherein the one or more inspection offset values define one or more points within the payload for inspection to begin (step 756).

The process 750 can further include wherein the one or more inspection offset values include a plurality of inspection offset values, and wherein the traffic inspection of the payload includes performing traffic inspection concurrently based on the plurality of inspection offset values. The plurality of inspection offset values can define one or more pieces of the payload to be inspected. The steps can further include defining a plurality of inspection offset values; and selecting one or more of the inspection offset values for the traffic inspection. The selecting can be performed at preconfigured time intervals, wherein the one or more selected inspection offset values are utilized for every payload encountered during the duration of a time interval subsequent to the selecting. The selecting can be performed responsive to receiving the payload. The selecting can be performed at random. The steps can further include assigning a probability to each inspection offset value of the plurality of inspection offset values; and selecting one or more of the inspection offset values for the traffic inspection based on the probability of each of the inspection offset values. The steps can include defining a plurality of inspection offset values; assigning a probability to each inspection offset value of the plurality of inspection offset values, wherein the probability assigned to each of the inspection offset values is based on a historic effectiveness of each of the inspection offset values; and selecting one or more of the inspection offset values for the traffic inspection based on the probability of each of the inspection offset values. The historic effectiveness of each of the inspection offset values can be based on any of global log data and local tenant-specific log data.

§ 8.0 Conclusion

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. Additionally, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

What is claimed is:

1. A method comprising steps of:
performing inline monitoring between one or more endpoints and the internet;
receiving a payload based on the inline monitoring;
logging, in log data generated from the inline monitoring, for each of the one or more rules (i) an average processing time for the rule and (ii) a hit ratio indicating historic effectiveness of the rule over a preconfigured time window;

computing, for each of the one or more rules, a probability assigned to the rule as a function of the average processing time and the hit ratio; and performing traffic inspection of the payload based on one or more rules, wherein each of the one or more rules are inspected based on the probability assigned thereto, such that the probability determines a frequency with which the rule is applied to inspect received payloads.

2. The method of claim 1, wherein each of the one or more rules are inspected concurrently for the payload, by parallel evaluation of the rules using multi-threading or parallel computing such that the payload is simultaneously examined against a plurality of the rules.

3. The method of claim 2, wherein each of the one or more rules are inspected concurrently by different processors.

4. The method of claim 1, wherein the probability assigned to each of the one or more rules is based on an execution time of each of the one or more rules.

5. The method of claim 1, wherein the probability assigned to each of the one or more rules is based on a historic effectiveness of each of the one or more rules, wherein the historic effectiveness comprises a hit ratio for the rule indicating how many times the rule has been triggered over a preconfigured time window, the hit ratio being determined from log data generated by the inline monitoring, and wherein a higher hit ratio corresponds to a higher probability for the rule.

6. The method of claim 1, wherein the probability assigned to each of the one or more rules is a function of an execution time of each of the one or more rules and a historic effectiveness of each of the one or more rules, wherein:

(a) the execution time comprises an average processing time for the rule determined from log data of inline monitoring; and (b) the historic effectiveness comprises a hit ratio for the rule determined from the log data over a preconfigured time window, such that rules having higher average processing times and lower hit ratios are assigned lower probabilities than rules having lower average processing times and higher hit ratios.

7. The method of claim 6, wherein the execution time of each of the one or more rules and the historic effectiveness of each of the one or more rules is based on global log data.

8. The method of claim 6, wherein the execution time of each of the one or more rules and the historic effectiveness of each of the one or more rules is based on tenant-based log data, wherein the inline monitoring is performed for a specific tenant.

9. The method of claim 6, wherein the steps further include:

selecting the one or more rules from a plurality of rules based on a probability assigned to each of the plurality of rules.

10. The method of claim 9, wherein the selecting is performed at preconfigured time intervals, and wherein the one or more selected rules are inspected for every payload encountered during a duration of a time interval subsequent to the selecting.

11. A non-transitory computer-readable medium comprising instructions that, when executed, cause one or more processors to perform steps of:

performing inline monitoring between one or more endpoints and the internet;

receiving a payload based on the inline monitoring;

logging, in log data generated from the inline monitoring, for each of the one or more rules (i) an average processing time for the rule and (ii) a hit ratio indicating historic effectiveness of the rule over a preconfigured time window;

computing, for each of the one or more rules, a probability assigned to the rule as a function of the average processing time and the hit ratio; and performing traffic inspection of the payload based on one or more rules, wherein each of the one or more rules are inspected based on the probability assigned thereto, such that the probability determines a frequency with which the rule is applied to inspect received payloads.

12. The non-transitory computer-readable medium of claim 11, wherein each of the one or more rules are inspected concurrently for the payload, by parallel evaluation of the rules using multi-threading or parallel computing such that the payload is simultaneously examined against a plurality of the rules.

13. The non-transitory computer-readable medium of claim 12, wherein each of the one or more rules are inspected concurrently by different processors.

14. The non-transitory computer-readable medium of claim 11, wherein the probability assigned to each of the one or more rules is based on an execution time of each of the one or more rules.

15. The non-transitory computer-readable medium of claim 11, wherein the probability assigned to each of the one or more rules is based on a historic effectiveness of each of the one or more rules, wherein the historic effectiveness comprises a hit ratio for the rule indicating how many times the rule has been triggered over a preconfigured time window, the hit ratio being determined from log data generated by the inline monitoring, and wherein a higher hit ratio corresponds to a higher probability for the rule.

16. The non-transitory computer-readable medium of claim 11, wherein the probability assigned to each of the one or more rules is a function of an execution time of each of the one or more rules and a historic effectiveness of each of the one or more rules, wherein:

(a) the execution time comprises an average processing time for the rule determined from log data of inline monitoring; and (b) the historic effectiveness comprises a hit ratio for the rule determined from the log data over a preconfigured time window, such that rules having higher average processing times and lower hit ratios are assigned lower probabilities than rules having lower average processing times and higher hit ratios.

17. The non-transitory computer-readable medium of claim 16, wherein the execution time of each of the one or more rules and the historic effectiveness of each of the one or more rules is based on global log data.

18. The non-transitory computer-readable medium of claim 16, wherein the execution time of each of the one or more rules and the historic effectiveness of each of the one or more rules is based on tenant-based log data, wherein the inline monitoring is performed for a specific tenant.

19. The non-transitory computer-readable medium of claim 16, wherein the steps further include:

selecting the one or more rules from a plurality of rules based on a probability assigned to each of the plurality of rules.

20. The non-transitory computer-readable medium of claim 19, wherein the selecting is performed at preconfigured time intervals, and wherein the one or more selected rules are inspected for every payload encountered during a duration of a time interval subsequent to the selecting.

\* \* \* \* \*